United States Patent
Wang et al.

(10) Patent No.: US 10,528,841 B2
(45) Date of Patent: Jan. 7, 2020

(54) METHOD, SYSTEM, ELECTRONIC DEVICE, AND MEDIUM FOR CLASSIFYING LICENSE PLATES BASED ON DEEP LEARNING

(71) Applicant: PING AN TECHNOLOGY (SHENZHEN) CO., LTD., Shenzhen (CN)

(72) Inventors: Jianzong Wang, Shenzhen (CN); Ming Liu, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 206 days.

(21) Appl. No.: 15/737,318

(22) PCT Filed: Jun. 23, 2017

(86) PCT No.: PCT/CN2017/089875
§ 371 (c)(1),
(2) Date: Dec. 18, 2017

(87) PCT Pub. No.: WO2017/220032
PCT Pub. Date: Dec. 28, 2017

(65) Prior Publication Data
US 2018/0253618 A1  Sep. 6, 2018

(30) Foreign Application Priority Data

Jun. 24, 2016  (CN) .......................... 2016 1 0470906

(51) Int. Cl.
*G06K 9/62*  (2006.01)
*G06K 9/32*  (2006.01)
(Continued)

(52) U.S. Cl.
CPC ......... *G06K 9/3258* (2013.01); *G06K 9/6256* (2013.01); *G06K 9/6273* (2013.01);
(Continued)

(58) Field of Classification Search
CPC ............... G06K 9/3258; G06K 9/6256; G06K 2209/23; G06K 2209/15; G06K 2209/015;
(Continued)

(56) References Cited

U.S. PATENT DOCUMENTS 5,577,166 A * 11/1996 Mizuno ................ G06K 9/6254
706/20
7,787,664 B2   8/2010 Luo et al.
(Continued)

FOREIGN PATENT DOCUMENTS

| CN | 103324920 A | 9/2013 |
| CN | 104182769 A | 12/2014 |

(Continued)

OTHER PUBLICATIONS

Qian Gao et al., License Plate Recognition Based on Prior Knowledge, Aug. 18, 2007, pp. 2964-2968, 2007 IEEE International Conference on Automation and Logistics.
(Continued)

*Primary Examiner* — Andrew M Moyer

(57) ABSTRACT

The present invention discloses a method, a system, an electronic device, and a medium for classifying license plates based on deep learning that are applied to an electronic device. The method includes: acquiring at least one photograph sent by a terminal device; preprocessing the acquired photograph such that the preprocessed photograph matches a plurality of input parameters of a pre-trained recognition model; and inputting the preprocessed photograph to the pre-trained recognition model to recognize
(Continued)

corresponding vehicle use information of the photograph, and sending the corresponding vehicle use information of the photograph to the terminal device. Thus, with this disclosure, the use of a vehicle in a photograph can be automatically and accurately recognized and further the photographs can be accurately classified, thereby improving the accuracy as well as the efficiency.

17 Claims, 3 Drawing Sheets

(51) Int. Cl.
  *G06N 3/04* (2006.01)
  *G06N 3/08* (2006.01)
  *G06N 5/04* (2006.01)
  *G08G 1/017* (2006.01)
(52) U.S. Cl.
  CPC .......... *G06N 3/0454* (2013.01); *G06N 3/084* (2013.01); *G06N 5/046* (2013.01); *G08G 1/0175* (2013.01); *G06K 2209/015* (2013.01); *G06K 2209/15* (2013.01); *G06K 2209/23* (2013.01)
(58) Field of Classification Search
  CPC .. G06K 9/6273; G06K 9/6268; G06K 9/6202; G06K 9/6267; G08G 1/0175; G06N 5/046; G06N 3/084; G06N 3/0454; G06N 3/08; G06Q 10/103
  USPC ......................................................... 382/156
  See application file for complete search history.

(56) References Cited

U.S. PATENT DOCUMENTS

| | | | |
|---|---|---|---|
| 8,194,938 | B2 | 6/2012 | Wechsler et al. |
| 2006/0171564 | A1* | 8/2006 | Simon .................... G06K 9/209 382/105 |
| 2006/0204107 | A1 | 9/2006 | Dugan et al. |
| 2008/0285804 | A1 | 11/2008 | Sefton et al. |
| 2013/0329961 | A1* | 12/2013 | Fan ...................... G06K 9/3258 382/105 |
| 2014/0063237 | A1* | 3/2014 | Stone .................... H04N 7/181 348/143 |
| 2014/0355821 | A1 | 12/2014 | Solem et al. |
| 2015/0125042 | A1* | 5/2015 | Haden ................ G06K 9/00771 382/105 |
| 2017/0154425 | A1* | 6/2017 | Pierce .................. G06K 9/4671 |

FOREIGN PATENT DOCUMENTS

| | | | | |
|---|---|---|---|---|
| CN | 104298976 | A | | 1/2015 |
| CN | 105184271 | A | | 12/2015 |
| CN | 105224956 | A | * | 1/2016 .......... G06K 9/6269 |
| CN | 105224956 | A | | 1/2016 |
| CN | 105488517 | A | | 4/2016 |
| CN | 105488532 | A | | 4/2016 |
| CN | 105590102 | A | | 5/2016 |
| CN | 105631470 | A | | 6/2016 |
| CN | 105654066 | A | * | 6/2016 ......... G06K 9/00624 |
| CN | 105654066 | A | | 6/2016 |
| CN | 106127248 | A | | 11/2016 |
| JP | 200786858 | A | | 4/2007 |
| JP | 2007293438 | A | | 11/2007 |

OTHER PUBLICATIONS

Riku Sakuta et al., Vehicle License No. Estimation from Low-Resolution Image Using Convolutional Neural Network, Jun. 10, 2016, pp. 15-19, The Papers of Technical Meeting, IEE Japan.

Angara, N. S. S., 'Automatic License Plate Recognition Using Deep Learning Techniques', Electrical Engineering Theses, University of Texas at Tyler, 2015.

Diederik P. Kingma et al., Adam: A Method for Stochastic Optimization, Jul. 23, 2015, pp. 1-15, Conference paper at the 3rd International Conference for Learning Representations (ICLR 2015).

* cited by examiner

| Network Configuration |
|---|
| 30-layer Network |
| Input an image: a 256×256 RGB image |
| Conv3-64<br>Conv3-64 |
| Maxpool2 |
| Conv3-128<br>Conv3-128 |
| Maxpool2 |
| Conv3-256<br>Conv3-256<br>Conv3-256<br>Conv3-256 |
| Maxpool2 |
| Conv3-512<br>Conv3-512<br>Conv3-512<br>Conv3-512 |
| Maxpool2 |
| Conv3-512<br>Conv3-512<br>Conv3-512<br>Conv3-512 |
| Maxpool2 |
| Conv3-512<br>Conv3-512<br>Conv3-512<br>Conv3-512 |
| Maxpool2 |
| FC-4096 |
| FC-2048 |
| FC-6 |
| Soft-max |

FIG. 3

METHOD, SYSTEM, ELECTRONIC DEVICE, AND MEDIUM FOR CLASSIFYING LICENSE PLATES BASED ON DEEP LEARNING

CROSS-REFERENCE TO RELATED APPLICATIONS

This application is the national phase entry of International Application No. PCT/CN2017/089875, filed on Jun. 23, 2017, which is based upon and claims priority to Chinese Patent Application No. CN2016104709069, filed on Jun. 24, 2016, the entire contents of which are incorporated herein by reference.

TECHNICAL FIELD

This disclosure relates generally to the technical field of data processing, and more particularly relates to a method, a system, an electronic device, and a computer-readable storage medium for classifying license plates based on deep learning.

BACKGROUND

In the course of conducting the related auto insurance businesses (e.g., auto insurance claims business), insurance companies at present may acquire a large number of photographs of the vehicles claiming insurance. In order to effectively manage the photographs of these vehicles, it is the common practice for the insurance companies to manually determine the use of the related vehicle (e.g., truck use, police use, private car use, military use, etc.) in each vehicle photograph, and then manually classify the photographs of these vehicles by their respective vehicle uses. This however not only consumes a lot of manpower and resources but also is prone to error.

SUMMARY

In view of the above, there is a need to provide a method, a system, an electronic device as well as a medium for classifying license plates based on deep learning, which can automatically and accurately identify the use of a vehicle in a photograph and also can accurately classify the vehicle, thereby improving the accuracy and the efficiency.

A method of classifying license plates based on deep learning is provided. The method may be applied to an electronic device and includes: acquiring at least one photograph sent by a terminal device, the photograph having license plate information of a corresponding vehicle; preprocessing the acquired at least one photograph such that the preprocessed at least one photograph matches input parameters of a pretrained recognition model; and inputting the preprocessed at least one photograph to the pretrained recognition model to recognize the vehicle use information corresponding to the at least one photograph, and sending the vehicle use information to the terminal device.

A system for classifying license plates based on deep learning is provided. The system may operate in an electronic device and includes: an acquisition module configured for acquiring at least one photograph sent by a terminal device, the photograph having license plate information of a corresponding vehicle; a preprocessing module configured for preprocessing the acquired at least one photograph such that the preprocessed at least one photograph matches input parameters of a pretrained recognition model; and a recognition module configured for inputting the preprocessed at least one photograph to the pretrained recognition model to recognize the vehicle use information corresponding to the at least one photograph, and sending the vehicle use information to the terminal device.

An electronic device is provided, the electronic device including a processing device, a storage device, and a system for classifying license plates based on deep learning. The system is stored in the storage device and includes at least one computer-readable instruction executable by the processing device to perform the following operations: acquiring at least one photograph sent by a terminal device, the photograph having license plate information of a corresponding vehicle; preprocessing the acquired at least one photograph such that the preprocessed at least one photograph matches input parameters of a pretrained recognition model; and inputting the preprocessed at least one photograph to the pretrained recognition model to recognize the vehicle use information corresponding to the at least one photograph, and sending the vehicle use information to the terminal device.

According to a fourth aspect of this application, a computer-readable storage medium is provided, the computer-readable storage medium having stored thereon at least one computer-readable instruction executable by a processing device to perform the following operations: acquiring at least one photograph sent by a terminal device, the photograph having license plate information of a corresponding vehicle; preprocessing the acquired at least one photograph such that the preprocessed at least one photograph matches input parameters of a pretrained recognition model; and inputting the preprocessed at least one photograph to the pretrained recognition model to recognize the vehicle use information corresponding to the at least one photograph, and sending the vehicle use information to the terminal device.

As can be seen from the above technical solutions according to this disclosure, a preset algorithm may first be used to train a recognition model for recognizing the vehicle use information based on the license plate information so as to obtain a pretrained recognition model. Then each photograph is input into the pretrained recognition model to identify the vehicle use information corresponding to the photograph, and then the corresponding vehicle use information of each photograph is sent to the terminal device. Furthermore, based on the corresponding vehicle use information of each photograph, the photographs with the same vehicle use can be classified into the same category. Therefore, with the present disclosure, the uses of vehicles in the photographs can be automatically and accurately identified and further the photographs can be accurately classified, so that the accuracy as well as the efficiency can be improved.

BRIEF DESCRIPTION OF THE DRAWINGS

FIG. 3 is a schematic diagram of a model structure of a deep convolutional neural network (CNN) model in accordance with the disclosure.

DETAILED DESCRIPTION OF THE INVENTION

Figures 1, 2:
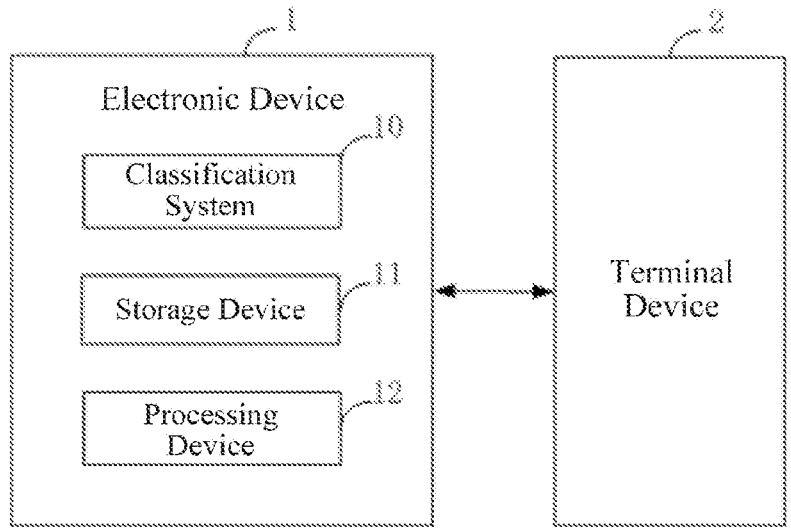
FIG. 1 is a schematic diagram of an application environment for an exemplary embodiment of a method of classifying license plates based on deep learning in accordance with the disclosure.
FIG. 2 is an illustrative flowchart of an exemplary embodiment of a method of classifying license plates based on deep learning in accordance with the disclosure.

FIG. 1 shows a schematic diagram of an application environment for an exemplary embodiment of a method of classifying license plates based on deep learning in accordance with this disclosure. The application environment may include an electronic device 1 and a terminal device 2. The electronic device 1 may perform data interaction with the terminal device 2 by using a suitable technology, such as a network or near field communications technology.

The terminal device 2 may include but is not limited to any electronic product such as a personal computer, a tablet computer, a smart phone, a Personal Digital Assistant (PDA), a game console, an Internet Protocol Television (IPTV), a smart wearable device or the like that can interact with a user through a keyboard, a mouse, a remote controller, a touch pad, or a voice control device. The network in which the user equipment and the network device are located includes but is not limited to the Internet, a wide area network, a metropolitan area network, a local area network, a Virtual Private Network (VPN), or the like.

The electronic device 1 is a device capable of automatically performing numerical computations and/or information processing according to instructions set or stored in advance. The electronic device 1 may be a computer, or may also be a single web server, a server group consisting of multiple web servers, or a cloud formed by a large number of hosts or web servers based on cloud computing. The cloud computing is a type of distributed computing, giving rise to a super virtual computer made up of a set of loosely coupled computers.

In this embodiment, the electronic device 1 may include a system 10 for classifying license plates based on deep learning (hereinafter referred to as "classification system 10"), a storage device 11, a processing device 12, and the like. The processing device 12 serves to support the operation of the electronic device 1, and may include one or more microprocessors, digital processors, and the like. The storage device 11 is used for storing various types of data and computer-readable instructions, and may include one or more non-volatile memories such as ROMs, EPROMs, flash memories, or the like.

The classification system 10 may first use a preset algorithm to train a recognition model which is used for recognizing the vehicle use information based on the license plate information, so as to obtain a pretrained recognition model. Then each photograph may be input to the pretrained recognition model to identify the corresponding vehicle use information of the photograph, and then the corresponding vehicle use information of each photograph may be sent to the terminal device 2. Furthermore, based on the corresponding vehicle use information of each photograph, the photographs with the same vehicle use information may be classified into one same category. In one embodiment, the classification system 10 may be stored in the storage device 11, and may include at least one computer-readable instruction stored in the storage device 11 and executable by the processor device 12 to perform the license plate classification methods according to various embodiments of this application. As will be described later, the at least one computer-readable instruction may be divided into different logic modules by different functions performed by its parts.

Therefore, with the present disclosure, the uses of vehicles in the photographs can be automatically and accurately identified and further the photographs can be accurately classified, thereby improving the accuracy as well as the efficiency.

FIG. 2 is an illustrative flowchart of an exemplary embodiment of a method of classifying license plates based on deep learning in accordance with the disclosure. The method according to this embodiment will not be limited to the steps shown in the flowchart, and some of these steps illustrated in the flowchart may be omitted or the order of these steps may be changed. The method may begin with step S10.

In S10, at least one photograph sent by a terminal device 2 is acquired.

In this embodiment, the terminal device 2 may be configured to be capable of displaying a vehicle-use-recognition operation interface. The terminal device 2 may display the vehicle-use-recognition operation interface in response to a user's operation. For example, the terminal device 2 may access the electronic device 1 through a browser system, and then the electronic device 1 may send the vehicle-use-recognition operation interface to the browser system for display. Alternatively, the classification system 10 may correspond to a client system installed in the terminal device 2, so that after running, the client system of the terminal device 2 may generate and display the vehicle-use-recognition operation interface.

The vehicle-use-recognition operation interface may include a single-photograph recognition control and a multi-photograph recognition control. With the single-photograph recognition control, the user can issue to the electronic device 1 an instruction for recognizing the vehicle use information corresponding to a single photograph which has license plate information of a vehicle sent by the terminal device, and then upload a photograph containing license plate information. With the multi-photograph recognition control, the user can issue to the electronic device 1 an instruction for recognizing the vehicle use information corresponding to multiple photographs which have license plate information of multiple vehicles sent by the terminal device, and then upload multiple photographs. The method may then proceed to step S11.

In S11, the acquired at least one photograph is preprocessed such that the preprocessed at least one photograph matches input parameters of a pretrained recognition model.

In this embodiment, the at least one photograph may be one or more photographs. Preprocessing the acquired at least one photograph such that the preprocessed at least one photograph matches the input parameters of the pretrained recognition model may include the following operations.

(1) The at least one photograph is whitened to filter out noise pixels in the photograph, so that each whitened photograph has a pixel mean of 0 and a pixel variance of 1.

In other embodiments, the at least one photograph may also be filtered by a filter, such as Gaussian low-pass filter, averaging filter, Gaussian filter, or the like, to filter out noise pixels in the photograph.

(2) The size of each whitened paragraph is adjusted based on input dimensions of the pretrained recognition model.

In this embodiment, the size of each of the adjusted photographs would be the same as the input dimensions of the pretrained recognition model. The input dimensions are actually the size of a picture, for example, a size of 256×256. If the size of each whitened photograph is larger than the input dimensions of the pretrained recognition model, then these whitened photographs may be reduced in size. If the size of each whitened photograph is smaller than the input dimensions of the pretrained recognition model, then these whitened photographs may be enlarged in size.

In this embodiment, the pretrained recognition model may be a trained deep convolutional neural network (CNN) model that may consist of 1 input layer, 20 convolutional layers, 6 pooling layers, 3 hidden layers, and 1 classification layer. A model structure of the deep CNN model is illustrated in FIG. 3, in which Conv a-b (e.g., Conv 3-64) denotes that the dimensions of the convolutional kernels at this layer are a×a, while the number of convolutional kernels at this layer is b; Maxpool2 indicates the dimensions of the pooling kernel at this pooling layer are 2×2; FC-c (e.g., FC-6) indicates that there are a number of c output nodes at the hidden layer (i.e., fully connected layer); Soft-max indicates that the classification layer uses Softmax classifier to classify the input images.

In this embodiment, photograph samples may be used for training and learning in order to obtain the trained deep CNN model. Thus, inputting a photograph to the trained deep CNN model, the use of a vehicle in the photograph can be automatically and accurately determined. The larger the size of the photograph samples, the higher the recognition rate of the trained deep CNN model.

In this embodiment, the training of the deep CNN model mainly includes the following process.

(1) A preset number (e.g., 500,000) of photograph samples having license plate information of a preset number of vehicles are first acquired. The license plate information may include a vehicle's license plate number and the like. For example, a police-purpose license plate may show a Chinese character "警"—meaning "Police", a military-purpose license plate may show a Chinese character "军"—meaning "Military", and so on.

(2) The acquired photograph samples are then classified according to vehicle use information which corresponds to the acquired photograph samples, so as to obtain at least one photograph category.

In this embodiment, the vehicle uses may include but are not limited to truck use, police use, private car use, and military use. The photograph categories may include but are not limited to truck-use photograph category, police-use photograph category, private-car-use photograph category, and military-use photograph category.

In this embodiment, the photograph samples corresponding to the same vehicle use may be classified into the same photograph category, while the photograph samples corresponding to different vehicle uses may be classified into different photograph categories.

(3) Then each photograph sample in each photograph category is whitened, and the size of each whitened photograph sample is adjusted, and then each adjusted photograph sample is rotated to obtain photograph sample sets under each photograph category.

In this embodiment, the photograph sample sets under each photograph category may specifically be acquired by the following process.

Each photograph sample in each photograph category is first whitened, with the whitened photograph sample having a pixel mean of 0 and a variance of 1, so that noise pixels in the photograph sample are filtered out. In other embodiments, the at least one photograph may also be filtered by a filter, such as Gaussian low-pass filter, averaging filter, Gaussian filter, or the like, to filter out the noise pixels in the photograph. Then the size of each whitened photograph sample is adjusted, with the size of each adjusted photograph sample being the same as the input dimensions of the deep CNN model. The input dimensions are actually the size of a picture, for example, a size of 256×256.

The each photograph sample in each photograph category is rotated at intervals of a preset rotation angle (e.g., 30 degree), and the rotated photograph sample is subjected to perspective change processing at the corresponding angle to obtain a photograph sample set for each photograph sample at the various rotation angles, finally obtaining the photograph sample sets under each photograph category.

(4) Afterwards, from among the photograph sample sets under each photograph category, those photograph sample sets to be trained under this photograph category as well as those photograph sample sets to be tested under this photograph category are then selected.

In this embodiment, from among the photograph sample sets under each photograph category, a first preset proportion (e.g., 70%) of photograph sample sets may be extracted as the photograph sample sets to be trained under this photograph category, while the photograph sample sets remained of this photograph category after the extraction may then be used as the photograph sample sets to be tested under this photograph category.

(5) Thereafter, the photograph samples in the photograph sample sets to be trained under each photograph category are input sequentially into the deep CNN model, and the preset training algorithm is used to train the deep CNN which is used for recognizing the vehicle use information based on the license plate information, and further the trained deep CNN model is tested using the photograph samples of the photograph sample sets to be tested under this photograph category.

In this embodiment, the photograph samples of the photograph sample sets to be tested under each photograph category can be used to test the trained deep CNN model. If the recognition accuracy of the trained deep CNN model is higher than or equal to a preset threshold (e.g., 95%), then the training is completed and this trained deep CNN then can subsequently be used to accurately recognize the use of a vehicle in a photograph.

Otherwise, if the recognition accuracy of the trained deep CNN model is lower than the preset threshold (e.g., 95%), then a reminder message may be issued to remind the user to increase the number of photograph samples containing license plate information and then retrain the deep CNN model according to the above steps (1)-(5).

In this embodiment, the principle of training the deep CNN model is disclosed as follows:

The training of the deep CNN model may adopt the parameters of the Cifar10 data classification task that comes with the third open source library (Convolutional Architecture for Fast Feature Embedding, Caffe). Caffe is a clear and efficient open source library for deep learning frameworks and can autonomously learn useful features from data, especially for some images, while Cifar10 is a database in Caffe.

In this embodiment, the preset training algorithm may be an adaptive moment estimation (Adam) algorithm. The Adam algorithm is a stochastic optimization-based algorithm that has made improvements over the momentum (i.e., learning potential) based stochastic gradient descent (SGD) algorithm. By adaptively estimating the momentum term, the process of attaining the model training goal can be accelerated.

The training process of the deep CNN model will always aim at minimizing the classification errors. Given a dataset D, the objective function that needs to be optimized during the training process is the average error L(m) of classifying various samples in the dataset:

$$L(m) = \frac{1}{|N|} \sum_{j}^{|N|} f_M(D^j) + \lambda \Gamma(M);$$

where $f_M(D^j)$ is the classification error of the j-th sample in the dataset, M represents the classification model, $\lambda\Gamma(M)$ is a regularization term, $\lambda$ is a regularization weight that controls the regularization degree, $\Gamma(M)$ is a regularization function that controls how to regularize the error function, and |N| represents the total number of samples in the dataset. Due to the fact that the dataset can contain a very large number of samples, we use a sample subset to estimate the average error of the original dataset which is $\bar{L}(M)$:

$$\bar{L}(m) = \frac{1}{|n|} \sum_{j}^{|n|} f_M(D^j) + \lambda \Gamma(M);$$

where |n| represents the number of samples in the sample subset. The model may produce errors in the forward propagation, and then propagate the error gradient $\nabla f_m$ backward and regularize the gradient $\nabla \Gamma(M)$ so as to update the model parameters. Different from the typical optimization algorithms based on SGD+BP, the above-described algorithm may be updated by the following steps:

$$(m_t)_i = \alpha_1 (m_{t-1})_i + (1 - \alpha_1)(\nabla L(M_t))_i;$$

$$(v_t)_i = \alpha_2 (m_{t-1})_i + (1 - \alpha_2)(\nabla L(M_t))_i^2;$$

$$(M_{t+1})_i = (M_t)_i - \alpha \frac{\sqrt{1-(\alpha_2)_i^t}}{1-(\alpha_1)_i^t} \times \frac{(m_t)_i}{\sqrt{(v_t)_i + \varepsilon}};$$

where $\nabla L(M)$ represents the gradient of the objective function, $m_t$ and $v_t$ are respectively the first-order momentum (mean value) estimation and the second-order momentum (partial variance) estimation of the gradient of the objective function at timestep t, $\alpha$ represents the corresponding decay rate of the first-order momentum, $\alpha_2$ represents the corresponding decay rate of the second-order momentum, $\varepsilon$ is a preset constant, $\alpha$ denotes the step size, t represents the timestep or the number of iterations, M represents the classification model, and i represents the ith sample.

During the training process, the three parameters $\alpha_1$, $\alpha_2$, and $\varepsilon$ may assume their respective default values: 0.9, 0.999, and $10^{-8}$. With the smoothness and fast convergence ability of the Adam algorithm during the optimization process, the model can quickly converge and the ideal classification accuracy can be attained even when the collected sample dataset is small. The method may then continue to step S12.

In step S12, the preprocessed at least one photograph is input to the pretrained recognition model to recognize the vehicle use information corresponding to the at least one photograph, and the vehicle use information is then sent to the terminal device 2.

In this embodiment, as can be known from the above principle of training the pretrained recognition model, the pretrained recognition model can identify the vehicle use information based on the license plate information. Thus, by using the preprocessed at least one photograph as the input to the pretrained recognition model, the corresponding vehicle use information of the at least one photograph can be accurately recognized.

In this embodiment, if the at least one photograph is a single photograph, then the corresponding vehicle use information of this single photograph may be sent to the terminal device 2. Otherwise if the at least one photograph includes multiple photographs, then the title of each photograph as well as the corresponding vehicle use information of the photograph may be sent to the terminal device 2.

In other embodiments, the method may further include: when the at least one photograph includes multiple photographs, classifying the at least one photograph according to vehicle use information corresponding to the at least one photograph.

In this embodiment, the vehicle uses may include but are not limited to truck use, police use, private car use, and military use. The photograph categories may include but are not limited to truck-use photograph category, police-use photograph category, private-car-use photograph category, and military-use photograph category.

In this embodiment, the photographs corresponding to the same vehicle use may be classified into the same photograph category, while the photographs corresponding to different vehicle uses may be classified into different photograph categories, and further, the classified photograph categories, as well as the title of each photograph in each photograph category and the corresponding vehicle use information of the photograph may be sent to the terminal device 2.

Figure 4:
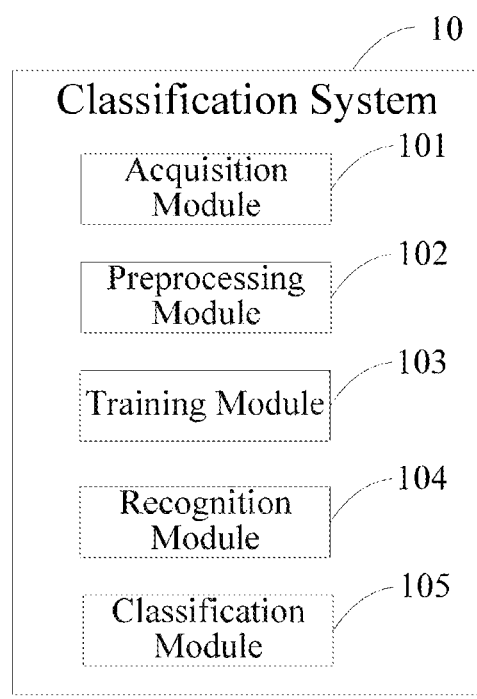
FIG. 4 is an illustrative functional block diagram of a system for classifying license plates based on deep learning in accordance with the disclosure.

As illustrated in FIG. 4, the program code of the classification system 10 may be divided into multiple functional modules depending on their different functions performed. In this embodiment, the classification system 10 may include an acquisition module 100, a preprocessing module 102, a training module 103, a recognition module 104, and a classification module 105. Functions of these various modules will be described in greater detail in the following embodiments.

The acquisition module 100 is configured for acquiring at least one photograph sent by a terminal device 2, the photograph having license plate information of a corresponding vehicle.

In this embodiment, the terminal device 2 may display a vehicle-use-recognition operation interface. The terminal device 2 may display the vehicle-use-recognition operation interface in response to a user's operation. For example, the terminal device 2 may access the electronic device 1 through a browser system, and then the electronic device 1 may send the vehicle-use-recognition operation interface to the browser system for display. Alternatively, the classification system 10 may correspond to a client system installed in the terminal device 2, so that after running, the client system of the terminal device 2 may generate and display the vehicle-use-recognition operation interface.

The vehicle-use-recognition operation interface may include a single-photograph recognition control and a multi-photograph recognition control. With the single-photograph recognition control, the user can issue to the electronic device 1 an instruction for recognizing the vehicle use information corresponding to a single photograph which has license plate information of a vehicle sent by the terminal device, and then upload a single photograph. The acquisition module may then acquire the instruction and then receive this photograph. With the multi-photograph recognition control, the user can issue to the electronic device 1 an instruction for recognizing the vehicle use information corresponding to multiple photographs which have license plate information of multiple vehicles sent by the terminal device, and then upload multiple photographs. The acquisition module 100 then may acquire the instruction and receive the multiple photographs.

The preprocessing module 102 is configured for preprocessing the acquired at least one photograph such that the preprocessed at least one photograph matches input parameters of a pretrained recognition model.

In this embodiment, the at least one photograph may be one or more photographs. The preprocessing module 102 may preprocess the acquired at least one photograph by the following process in order that the preprocessed at least one photograph matches the input parameters of the pretrained recognition model.

(1) The at least one photograph is first whitened to filter out noise pixels in the photograph, so that the each whitened photograph has a pixel mean of 0 and a pixel variance of 1.

In other embodiments, the at least one photograph may also be filtered by a filter, such as Gaussian low-pass filter, averaging filter, Gaussian filter, or the like, to filter out noise pixels in the photograph (2) The size of each whitened paragraph is adjusted based on input dimensions of the pretrained recognition model.

In this embodiment, the size of each of the adjusted photographs would be the same as the input dimensions of the pretrained recognition model. The input dimensions are actually the size of a picture, for example, a size of 256×256. If the size of each whitened photograph is larger than the input dimensions of the pretrained recognition model, then these whitened photographs may be reduced in size.

Otherwise if the size of each whitened photograph is smaller than the input dimensions of the pretrained recognition model, then these whitened photographs may be enlarged in size.

In this embodiment, the pretrained recognition model may be a trained deep convolutional neural network (CNN) model. The deep CNN model may consist of 1 input layer, 20 convolutional layers, 6 pooling layers, 3 hidden layers, and 1 classification layer. A model structure of the deep CNN model is illustrated in FIG. 3, in which Conv a-b (e.g., Conv 3-64) denotes the dimensions of the convolutional kernels at this layer are a×a, while the number of convolutional kernels at this layer is b; Maxpool2 indicates the dimensions of the pooling kernel at the pooling layer are 2×2; FC-c (e.g., FC-6) indicates that there are a number of c output nodes at the hidden layer (i.e., fully connected layer); Soft-max indicates that the classification layer uses Softmax classifier to classify the input images.

In this embodiment, the training module 103 may be configured for using photograph samples for training and learning purposes in order to obtain the trained deep CNN model. Thus, inputting a photograph to the trained deep CNN model, the use of a vehicle in the photograph can be automatically and accurately determined. The larger the size of the photograph samples, the higher the recognition rate of the trained deep CNN model.

In this embodiment, the process of the training module 103 training the deep CNN model mainly includes the following.

(1) A preset number (e.g., 500,000) of photograph samples having license plate information of a preset number of vehicles are first acquired. The license plate information may include a vehicle's license plate number and the like. For example, a police-purpose license plate may show a Chinese character "警"—meaning "Police", a military-purpose license plate may show a Chinese character "军"—meaning "Military", and so on.

(2) The acquired photograph samples are then classified according to the vehicle use information which corresponds to the acquired photograph samples, so as to obtain at least one photograph category.

In this embodiment, the vehicle uses may include but are not limited to truck use, police use, private car use, and military use. The photograph categories may include but are not limited to truck-use photograph category, police-use photograph category, private-car-use photograph category, and military-use photograph category.

In this embodiment, the photograph samples corresponding to the same vehicle use may be classified into the same photograph category, while the photograph samples corresponding to different vehicle uses may be classified into different photograph categories.

(3) Then each photograph sample in each photograph category is whitened, and the size of each whitened photograph sample is adjusted, and then each adjusted photograph sample is rotated to obtain photograph sample sets under each photograph category.

In this embodiment, the photograph sample sets under each photograph category may be specifically acquired by the following process.

Each photograph sample in each photograph category is first whitened, with the whitened photograph sample having a pixel mean of 0 and a variance of 1, so that noise pixels in the photograph sample are filtered out. In other embodiments, the at least one photograph may also be filtered by a filter, such as Gaussian low-pass filter, averaging filter, Gaussian filter, or the like, to filter out the noise pixels in the photograph.

Thereafter, the size of each whitened photograph sample is adjusted, with the size of each adjusted photograph sample being the same as the input dimensions of the deep CNN model. The input dimensions are actually the size of a picture, for example, a size of 256×256.

The each photograph sample in each photograph category is rotated at intervals of a preset rotation angle (e.g., 30 degree), and the rotated photograph sample is subjected to perspective change processing at the corresponding angle to obtain a photograph sample set for each photograph sample at the various rotation angles, finally obtaining the photograph sample sets under each photograph category.

(4) Afterwards, from among the photograph sample sets under each photograph category, those photograph sample sets to be trained under this photograph category as well as those photograph sample sets to be tested under this photograph category are then selected.

In this embodiment, from among the photograph sample sets under each photograph category, a first preset proportion (e.g., 70%) of photograph sample sets may be extracted as the photograph sample sets to be trained under this photograph category, while the photograph sample sets remained of this photograph category after the extraction may then be used as the photograph sample sets to be tested under this photograph category.

(5) Thereafter, the photograph samples in the photograph sample sets to be trained under each photograph category are input sequentially into the deep CNN model, and the preset training algorithm is used to train the deep CNN which is used for recognizing the vehicle use information based on the license plate information, and further the trained deep CNN model is tested using the photograph samples of the photograph sample sets to be tested under this photograph category.

In this embodiment, the photograph samples of the photograph sample sets to be tested under each photograph category can be used to test the trained deep CNN model. If the recognition accuracy of the trained deep CNN model is higher than or equal to a preset threshold (e.g., 95%), then the training is completed and this trained deep CNN model can subsequently be used to accurately recognize the use of a vehicle in a photograph.

Otherwise if the recognition accuracy of the trained deep CNN model is lower than the preset threshold (e.g., 95%), then a reminder message may be issued to remind the user to increase the number of photograph samples containing license plate information and then retrain the deep CNN model according to the above steps (1)-(5).

In this embodiment, the principle of training the deep CNN model is disclosed as follows:

The training of the deep CNN model may adopt the parameters of the Cifar10 data classification task that comes with the third open source library (Convolutional Architecture for Fast Feature Embedding, Caffe). Caffe is a clear and efficient open source library for deep learning frameworks and can autonomously learn useful features from data, especially for some images, while Cifar10 is a database in Caffe.

In this embodiment, the preset training algorithm may be an adaptive moment estimation (Adam) algorithm. The Adam algorithm is a stochastic optimization-based algorithm that has made improvements over the momentum (i.e., learning potential) based stochastic gradient descent (SGD) algorithm. By adaptively estimating the momentum term, the process of attaining the model training goal can be accelerated.

The training process of the deep CNN model will always aim at minimizing the classification errors. Given a dataset D, the objective function that needs to be optimized during the training process is the average error L(m) of classifying various samples in the dataset:

$$L(m) = \frac{1}{|N|} \sum_{j}^{|N|} f_M(D^j) + \lambda \Gamma(M);$$

where $f_M(D^j)$ is the classification error of the jth sample in the dataset, M represents the classification model, $\lambda \Gamma(M)$ is a regularization term, $\Delta$ is a regularization weight that controls the regularization degree, $\Gamma(M)$ is a regularization function that controls how to regularize the error function, and |N| represents the total number of samples in the dataset. Due to the fact that the dataset can contain a very large number of samples, we use a sample subset to estimate the average error of the original dataset which is $\overline{L}(M)$:

$$\overline{L}(m) = \frac{1}{|n|} \sum_{j}^{|n|} f_M(D^j) + \lambda \Gamma(M);$$

where |n| represents the number of samples in the sampled subsets. The model may produce errors in the forward propagation, and then propagate the error gradient $\nabla f_m$ backward and regularize the gradient $\nabla \Gamma(M)$ so as to update the model parameters. Different from the typical optimization algorithms based on SGD+BP, the above-described algorithm may be updated by the following steps:

$$(m_t)_i = \alpha_1 (m_{t-1})_i + (1 - \alpha_1)(\nabla L(M_t))_i;$$

$$(v_t)_i = \alpha_2 (m_{t-1})_i + (1 - \alpha_2)(\nabla L(M_t))_i^2;$$

$$(M_{t+1})_i = (M_t)_i - \alpha \frac{\sqrt{1 - (\alpha_2)_i^t}}{1 - (\alpha_1)_i^t} \times \frac{(m_t)_i}{\sqrt{(v_t)_i + \varepsilon}};$$

where $\nabla L(M_t)$ represents the gradient of the objective function, $m_t$ and $v_t$ are respectively the first-order momentum (mean value) estimation and the second-order momentum (partial variance) estimation of the gradient of the objective function at timestep t, $\alpha_1$ represents the corresponding decay rate of the first-order momentum, $\alpha_2$ represents the corresponding decay rate of the second-order momentum, $\varepsilon$ is a preset constant, $\alpha$ denotes the step size, t represents the timestep or the number of iterations, M represents the classification model, and i represents the ith sample.

During the training process, the three parameters $\alpha_1$, $\alpha_2$, and $\varepsilon$ may assume their respective default values: 0.9, 0.999, and $10^{-8}$. With the smoothness and fast convergence ability of the Adam algorithm during the optimization process, the model can quickly converge and the ideal classification accuracy can be attained even when the collected sample dataset is small.

The recognition module 104 is configured for inputting the preprocessed at least one photograph to the pretrained recognition model to recognize the vehicle use information corresponding to the at least one photograph, and then sending the vehicle use information to the terminal device 2.

In this embodiment, as can be known from the above principle of training the pretrained recognition model, the pretrained recognition model can identify the vehicle use information based on the license plate information. Thus, by using the preprocessed at least one photograph as the input to the pretrained recognition model, the corresponding vehicle use information of the at least one photograph can be accurately recognized.

In this embodiment, if the at least one photograph is a single photograph, then the recognition module 104 may send the corresponding vehicle use information of this single photograph to the terminal device 2. Otherwise if the at least one photograph includes multiple photographs, then the recognition module 104 may send the title of each photograph as well as the corresponding vehicle use information of this photograph to the terminal device 2.

In other embodiments, the classification module 105 may be configured for: when the at least one photograph includes multiple photographs, classifying the at least one photograph according to the vehicle use information corresponding to the at least one photograph.

In this embodiment, the vehicle uses may include but are not limited to truck use, police use, private car use, and military use. The photograph categories may include but are not limited to truck-use photograph category, police-use photograph category, private-car-use photograph category, and military-use photograph category.

In this embodiment, the photographs corresponding to the same vehicle use may be classified into the same photograph category, while the photographs corresponding to different vehicle uses may be classified into different photograph categories, and further, the classified photograph categories, as well as the title of each photograph in each photograph category and the corresponding vehicle use information of the photograph may be sent to the terminal device 2.

Additionally, various functional units described in the embodiments herein may be integrated into one processing unit or may be present as a number of physically separated units, and two or more units may be integrated into one. The above integrated units may be implemented by hardware or by hardware in combination with software functional modules.

It will be apparent to those skilled in the art that this disclosure won't be limited to the details of the foregoing exemplary embodiments and may also be embodied in other specific forms without departing from the spirit or essential characteristics of the disclosure. Thus, the foregoing embodiments are to be regarded in all respects as illustrative and not restrictive, and the scope of the disclosure is defined by the appended claims rather than by the foregoing description. The present disclosure is therefore intended to embrace all changes that fall within the meanings and ranges of the equivalent elements of the claims. No reference sign shown in the accompanying drawings that are recited in a claim should be considered as a restriction on the claim involved. In addition, it is manifest that the term "comprising," or "including," does not exclude other elements or steps, and the singular form does not exclude the plural. A plurality of units or devices recited in the system claims may also be implemented by one unit or device through software or hardware. Terms such as "first," "second," (if any) are used to indicate names rather than any particular order.

It will be appreciated that the foregoing embodiments are merely illustrative of the technical solutions of this disclosure and are not restrictive. Although the present disclosure has been described in detail in connection to some exemplary embodiments, those of ordinary skill in the art will understand that various modifications, changes, or equivalent substitutions can be made to the disclosure without departing from the spirit and scope of the technical solutions of the disclosure.

What is claimed is:

1. A method of classifying license plates based on deep learning, wherein the method is applied to an electronic device and comprises the steps of:
    acquiring at least one photograph sent by a terminal device, the acquired photograph having license plate information of at least one vehicle;
    preprocessing the acquired photograph to obtain at least one photograph matches a plurality of input parameters of a pre-trained recognition model; and
    inputting the preprocessed photograph to the pre-trained recognition model to recognize vehicle use information corresponding to the preprocessed photograph based on the corresponding license plate information, and sending the vehicle use information to the terminal device, wherein the terminal device comprises a vehicle-use-recognition operation interface including a single-photograph recognition control and a multi-photograph recognition control;
    if the acquired photograph is a single photograph of a vehicle, receiving a first instruction for recognizing vehicle use information of the single photograph having license plate information of the vehicle sent by the terminal device, and sending the vehicle use information of the single photograph to the terminal device, wherein the first instruction is issued through the single-photograph recognition control to the electronic device; or
    if the acquired photograph comprises multiple photographs of a plurality of vehicles, receiving a second instruction for recognizing vehicle use information the multiple photographs having license plate information of the plurality of vehicles sent by the terminal device, and sending a title of each of the multiple photographs as well as the corresponding vehicle use information of each of the multiple photographs to the terminal device, wherein the second instruction is issued through the multi-photograph recognition control to the electronic device.

2. The method of claim 1, wherein the plurality of input parameters of the pre-trained recognition model comprises:
    whitening the photograph to filter out a plurality of noise pixels in the acquired photograph, wherein the whitened photograph has a pixel mean of 0 and a pixel variance of 1; and
    adjusting a size of the whitened photograph according to an input dimension of the pre-trained recognition model.

3. The method of claim 1, wherein the pre-trained recognition model is a trained deep convolutional neural network (CNN) model, and the deep CNN model is trained by the following processes:
    acquiring a plurality of preset photograph samples having license plate information of a plurality of preset vehicles;
    classifying the acquired photograph samples according to vehicle use information thereof to obtain at least one photograph category;
    whitening each photograph sample in each photograph category, adjusting a size of the whitened photograph sample, and rotating the adjusted photograph sample to obtain a plurality of photograph sample sets under the photograph category;
    acquiring a plurality of photograph sample sets to be trained under a photograph category and a plurality of photograph sample sets to be tested under a photograph category from the photograph sample sets under the photograph category; and
    inputting the plurality of photograph samples of the photograph sample sets to be trained sequentially into the deep CNN model, using a preset training algorithm to train the deep CNN model used for recognizing vehicle use information based on license plate information, and testing the trained deep CNN model using the plurality of photograph samples of the plurality of photograph sample sets to be tested under each photograph category.

4. The method of claim 1, further comprising:
    when the acquired photograph includes a plurality of photographs, classifying the acquired photograph according to vehicle use information thereof, so that the acquired photographs with the same vehicle use information are classified into a same photograph category, and the acquired photographs with different vehicle use information are classified into different photograph categories.

5. The method of claim 1, wherein the electronic device is a computer, a single web server, a server group consisting of a plurality of web servers, or a cloud formed by a plurality of hosts or a plurality of web servers based on cloud computing.

6. The method of claim 3, further comprising:
    completing the training of the deep CNN model and using the trained CNN model for subsequent recognition of the user of a vehicle in a photograph when a recognition accuracy of the trained deep CNN model is higher than or equal to a preset threshold; and issuing a reminder message to remind a user to increase the number of the plurality of photograph samples containing license plate information and retrain the deep CNN model according to the operations recited in claim 3 when the recognition accuracy of the trained deep CNN model is lower than the preset threshold.

7. An electronic device comprising a processing device, a storage device, a system for classifying a plurality of license plates based on deep learning stored in the storage device and at least one computer-readable instruction, wherein the computer-readable instruction is executable by the processing device to perform the following operations:

acquiring at least one photograph sent by a terminal device, the acquired photograph having license plate information of at least one vehicle;

preprocessing the acquired photograph to obtain at least one photograph matches a plurality of input parameters of a pre-trained recognition model; and inputting the preprocessed photograph to the pre-trained recognition model to recognize vehicle use information corresponding to the preprocessed photograph based on the corresponding license plate information, and sending the vehicle use information to the terminal device, wherein the terminal device comprises a vehicle-use-recognition operation interface including a single-photograph recognition control and a multi-photograph recognition control;

if the acquired photograph is a single photograph of a vehicle, receiving a first instruction for recognizing vehicle use information of the single photograph having license plate information of the vehicle sent by the terminal device, and sending the vehicle use information of the single photograph to the terminal device, wherein the first instruction is issued through the single-photograph recognition control to the electronic device; or if the acquired photograph comprises multiple photographs of a plurality of vehicles, receiving a second instruction for recognizing vehicle use information the multiple photographs having license plate information of the plurality of vehicles sent by the terminal device, and sending a title of each of the multiple photographs as well as the corresponding vehicle use information of each of the multiple photographs to the terminal device, wherein the second instruction is issued through the multi-photograph recognition control to the electronic device.

8. The electronic device of claim 7, wherein the plurality of input parameters of the pre-trained recognition model comprises:

whitening the acquired photograph to filter out a plurality of noise pixels in the acquired photograph, wherein the whitened photograph has a pixel mean of 0 and a pixel variance of 1; and adjusting a size of the whitened photograph according to an input dimension of the pre-trained recognition model.

9. The electronic device of claim 7, wherein the pre-trained recognition model is a trained deep convolutional neural network (CNN) model, and the deep CNN model is trained by the following processes:

acquiring a plurality of preset photograph samples having license plate information of a plurality of preset vehicles;

classifying the acquired photograph according to vehicle use information thereof to obtain at least one photograph category;

whitening each photograph sample in each photograph category, adjusting a size of the whitened photograph sample, and rotating the adjusted photograph sample to obtain a plurality of photograph sample sets under the photograph category;

acquiring a plurality of photograph sample sets to be trained under a photograph category and a plurality of photograph sample sets to be tested under a photograph category; and inputting the plurality of photograph samples of the photograph sample sets to be trained sequentially into the deep CNN model, using a preset training algorithm to train the deep CNN model used for recognizing vehicle use information based on license plate information, and testing the trained deep CNN model using the plurality of photograph samples of the plurality of photograph sample sets to be tested under each photograph category.

10. The electronic device of claim 7, wherein the computer-readable instruction is executable by the processing device to further perform the following operations:

when the acquired photograph includes a plurality of photographs, classifying the photograph by vehicle use information thereof, so that the acquired photographs with the same vehicle use are classified into a same photograph category, and the acquired photographs with different vehicle use information are classified into different photograph categories.

11. The electronic device of claim 7, wherein the electronic device is a computer, a single web server, a server group consisting of a plurality of web servers, or a cloud formed by a plurality of hosts or a plurality of web servers based on cloud computing.

12. The electronic device of claim 9, wherein the computer-readable instruction is executable by the processing device to further perform the following operations:

completing the training of the deep CNN model and using the trained CNN model for subsequent recognition of the user of a vehicle in a photograph when a recognition accuracy of the trained deep CNN model is higher than or equal to a preset threshold; and issuing a reminder message to remind a user to increase the number of the plurality of photograph samples containing license plate information and retrain the deep CNN model according to the operations recited in claim 9 when the recognition accuracy of the trained deep CNN model is lower than the preset threshold.

13. A non-transitory computer-readable storage medium, wherein the computer-readable storage medium comprises at least one computer-readable instruction executable by a processing device to perform the following operations:

acquiring at least one photograph sent by a terminal device, the acquired photograph having license plate information of at least one vehicle;

preprocessing the acquired photograph to obtain at least one photograph matches a plurality of input parameters of a pre-trained recognition model; and inputting the preprocessed photograph to the pre-trained recognition model to recognize vehicle use information corresponding to the photograph based on the corresponding license plate information, and sending the vehicle use information to the terminal device, wherein the terminal device comprises a vehicle-use-recognition operation interface including a single-photograph recognition control and a multi-photograph recognition control;

if the acquired photograph is a single photograph of a vehicle, receiving a first instruction for recognizing vehicle use information of the single photograph having license plate information of the vehicle sent by the terminal device, and sending the vehicle use information of the single photograph to the terminal device, wherein the first instruction is issued through the single-photograph recognition control to the electronic device; or if the acquired photograph comprises multiple photographs of a plurality of vehicles, receiving a second instruction for recognizing vehicle use information the multiple photographs having license plate information of the plurality of vehicles sent by the terminal device, and sending a title of each of the multiple photographs as well as the corresponding vehicle use information of each of the multiple photographs to the terminal device, wherein the second instruction is issued through the multi-photograph recognition control to the electronic device.

14. The non-transitory computer-readable storage medium of claim 13, wherein the plurality of input parameters of the pre-trained recognition model comprises:

whitening the acquired photograph to filter out a plurality of noise pixels in the acquired photograph, wherein the whitened photograph has a pixel mean of 0 and a pixel variance of 1; and adjusting a size of the whitened photograph according to an input dimension of the pretrained recognition model.

15. The non-transitory computer-readable storage medium of claim 13, wherein the pretrained recognition model is a trained deep convolutional neural network (CNN) model, and the deep CNN model is trained by the following processes:

acquiring a plurality of preset photograph samples having license plate information of a plurality of preset vehicles;

classifying the acquired photograph according to vehicle use information thereof to obtain at least one photograph category;

whitening each photograph sample in each photograph category, adjusting a size of the whitened photograph sample, and rotating the adjusted photograph sample to obtain a plurality of photograph sample sets under the photograph category;

acquiring a plurality of photograph sample sets to be trained under a photograph category and a plurality of photograph sample sets to be tested under a photograph category; and inputting the plurality of photograph samples of the photograph sample sets to be trained sequentially into the deep CNN model, using a preset training algorithm to train the deep CNN model used for recognizing vehicle use information based on license plate information, and testing the trained deep CNN model using the plurality of photograph samples of the plurality of photograph sample sets to be tested under each photograph category.

16. The non-transitory computer-readable storage medium of claim 13, wherein the computer-readable instruction is executable by the processing device to further perform the following operations:

when the acquired photograph includes a plurality of photographs, classifying the photograph according to vehicle use information, so that the acquired photographs with the same vehicle use information are classified into a same photograph category, and the acquired photographs with different vehicle use information are classified into different photograph categories.

17. The non-transitory computer-readable storage medium of claim 15, wherein the computer-readable instruction is executable by the processing device to further perform the following operations:

completing the training of the deep CNN model and using the trained CNN model for subsequent recognition of the user of a vehicle in a photograph when a recognition accuracy of the trained deep CNN model is higher than or equal to a preset threshold; and issuing a reminder message to remind a user to increase the number of the plurality of photograph samples containing license plate information and retrain the deep CNN model according to the operations recited in claim 15 when the recognition accuracy of the trained deep CNN model is lower than the preset threshold.

* * * * *